United States Patent
Tene et al.

(10) Patent No.: US 7,865,701 B1
(45) Date of Patent: Jan. 4, 2011

(54) CONCURRENT ATOMIC EXECUTION

(75) Inventors: Gil Tene, Los Altos Hills, CA (US);
Ivan Posva, Menlo Park, CA (US);
Michael A. Wolf, San Francisco, CA (US); Daniel Dwight Grove, San Jose, CA (US); Tom Kraljevic, San Jose, CA (US)

(73) Assignee: Azul Systems, Inc., Mountain View, CA (US)

( * ) Notice: Subject to any disclaimer, the term of this patent is extended or adjusted under 35 U.S.C. 154(b) by 624 days.

(21) Appl. No.: 11/227,422

(22) Filed: Sep. 14, 2005

Related U.S. Application Data

(60) Provisional application No. 60/610,028, filed on Sep. 14, 2004.

(51) Int. Cl.
*G06F 9/00* (2006.01)

(52) U.S. Cl. ............ 712/220; 712/228; 718/106

(58) Field of Classification Search .......... 712/228, 712/220; 718/106
See application file for complete search history.

(56) References Cited

U.S. PATENT DOCUMENTS

| | | | |
|---|---|---|---|
| 5,860,017 A | 1/1999 | Sharangpani et al. | |
| 6,370,625 B1 | 4/2002 | Carmean et al. | |
| 6,487,652 B1 | 11/2002 | Gomes et al. | |
| 6,662,360 B1 | 12/2003 | Hay et al. | |
| 6,732,363 B1 | 5/2004 | Chaudhry et al. | |
| 6,748,496 B1 | 6/2004 | Scarpino | |
| 6,862,664 B2 | 3/2005 | Tremblay et al. | |
| 6,938,130 B2 | 8/2005 | Jacobson et al. | |
| 7,120,762 B2 * | 10/2006 | Rajwar et al. ............ | 711/150 |
| 2003/0014602 A1 | 1/2003 | Shibayama et al. | |
| 2003/0079094 A1 | 4/2003 | Rajwar et al. | |
| 2003/0084271 A1 | 5/2003 | Lindwer | |
| 2003/0167292 A1 | 9/2003 | Ross | |
| 2003/0208673 A1 | 11/2003 | Chaudhry et al. | |
| 2004/0117573 A1 | 6/2004 | Sutanto et al. | |
| 2004/0162948 A1 | 8/2004 | Temblay et al. | |
| 2004/0162967 A1 | 8/2004 | Tremblay et al. | |
| 2004/0162968 A1 | 8/2004 | Tremblay et al. | |
| 2004/0163082 A1 | 8/2004 | Tremblay et al. | |
| 2004/0187115 A1 | 9/2004 | Tremblay et al. | |
| 2004/0187116 A1 | 9/2004 | Tremblay et al. | |
| 2004/0187123 A1 | 9/2004 | Tremblay et al. | |
| 2005/0204119 A1 | 9/2005 | Saha | |
| 2005/0268073 A1 | 12/2005 | Karp | |

OTHER PUBLICATIONS

Rajwar et al, Improving the Throughput of Synchronization by Insertion of Delays, (HPCA), Jan. 2000.
Hammond et al., Programming with Transactional Coherence and Consistency (TCC), 2004.

(Continued)

*Primary Examiner*—Chun-Kuan Lee
*Assistant Examiner*—Benjamin P Geib
(74) *Attorney, Agent, or Firm*—Van Pelt, Yi & James LLP

(57) ABSTRACT

Executing a set one or more instructions atomically is disclosed. Executing includes saving a set of one or more register states in a software data structure, speculatively executing the set of instructions, and restoring the state of one or more registers when an abort indication is received.

10 Claims, 16 Drawing Sheets

OTHER PUBLICATIONS

Hammond et al., Transactional Memory Coherence and Consistency, Stanford University.

Hammond et al., Transactional Memory Coherence and Consistency, "all transactions, all the time", Stanford University, Jun. 21, 2004.

Sean Lie, Hardware Support for Unbounded Transactional Memory, Massachusetts Institute of Technology, May 7, 2004.

Herlihy et al., Transactional Memory: Architectural Support for Lock-Free Data Structures, University of Massachusetts.

Rajwar et al., Transactional Lock-Free Execution of Lock-Based Programs, University of Wisconsin-Madison, (ASPLOS), Oct. 2002.

Ravi Rajwar, Speculation-Based Techniques for Lock-Free Execution of Lock-Based Programs, University of Wisconsin-Madison, 2002.

Ananian et al., Unbounded Transactional Memory, Feb. 2005.

Hammond et al, Transactional Memory Coherence and Consistency, Stanford University, 2004.

Jose F. Martinez and Josep Torrellas, Speculative Locks for Concurrent Execution of Critical Sections in Shared-Memory Multiprocessors, Jose F. Martinez and Josep Torrellas, Workshop on Memory Performance Issues, Intl. Symposium on Computer Architecture, Jun. 2001 ("Speculative Locks 2001").

Jose F. Martinez and Josep Torrellas, Speculative Locks for Concurrent Execution of Critical Sections in Shared-Memory Multiprocessors, Jose F. Martinez and Josep Torrellas, Technical Report, UIUCCS-R-2001-2202, UILU-ENG-2001-1706, Department of Computer Science, University of Illinois, Feb. 2001 ("Speculative Locks Tech. Report 2001").

Jose F. Martinez and Josep Torrellas, Speculative Synchronization: Applying Thread-Level Speculation to Explicitly Parallel Applications, Advanced Symposium on Programming Languages and Operating Systems, Oct. 2002, San Jose, CA ("Speculative Synch. 2002").

Janice M. Stone, Harold S. Stone, Philip Heidelberger, and John Turek, Multiple Reservations and the Oklahoma Update, IEEE Parallel and Distributed Technology, 1993 ("Oklahoma Update 1993").

Steven S. Lumetta, Detection of Synchronization Errors through Speculative Lock Elision, Supplement of the International Conference on Dependable Systems and Networks, Bethesda, Maryland, Jun. 2002 ("Synchronization Errors 2002").

Rajwar et al. "Speculative Lock Elision: Enabling Highly Concurrent Multithreaded Execution." University of Wisconsin-Madison, 2001.

Martinez et al. "Speculative Synchronization in Shared Memeory Multiprocessors", Technical Report UIUCDSC-R-2001-2255, Univerisy of Illinois at Urbana-Champaign, Nov. 2001.

"Annual Review of Scalable Computing" edited by Yuen Chung Kwong (National University of Singapore), 2000.

Moshovos et al, "Dynamic Speculation and Synchronization of Data Dependences", University of Wisconsin-Madison, Computer Architecture 1997. Conference Proceeding, the 24th Annual International Symposium on; Publication date Jun. 2-4, 1997, pp. 181-193.

Chen et al., "TEST: A Tracer for Extracting Speculative Threads", The 2003 International Symposium on Code Generation and Optimization, San Francisco, CA, Mar. 2003.

Cintra et al., "Eliminating Squashes Through Learning Cross-Thread Violations in Speculative Parallelization for Multiprocessors", High-Performance Computer Architecture, 2002. Proceedings. Eighth International Symposium on Publcation Date Feb. 2-6, 2002 on pp. 43-54.

Steffan et al., "Improving Value Communication for Thread-Level Speculation", High-Performance Computer Architecture, 2002. Proceedings. Eighth International Symposium on Publication Date Feb. 2-6, 2002, pp. 65-75.

* cited by examiner

| | Object: | | Lock: | |
|---|---|---|---|---|
| | Thread ID | Lock Word | Thread ID | Lock Word |
| Thin Locked | [Thread ID] | 1 | X | X |
| Should Thin Lock | X | 0 | X | X |
| Thick Locked | [Inflated Indicator] | 1 | [Thread ID] | 1 |
| Should Thick Lock | [Inflated Indicator] | 1 | [Thread ID] | 0 |
| Speculative State | [Inflated Indicator] | 1 | [Speculative Indicator] | 1 |

CONCURRENT ATOMIC EXECUTION

CROSS REFERENCE TO OTHER APPLICATIONS

This application claims priority to U.S. Provisional Patent Application No. 60/610,028 entitled VIRTUAL MACHINE filed Sep. 14, 2004, which is incorporated herein by reference for all purposes.

BACKGROUND OF THE INVENTION

In computer programming, a critical section is a piece of code that needs to be executed by one process or thread at a time. Some synchronization mechanism is required at the entry and exit of the critical section to ensure exclusive use. For example, a lock may be acquired at the entry of the critical section and released at the exit. This causes execution of critical sections of code to be serialized, which can be inefficient when there is no contention for the lock during this time. In other synchronization mechanisms, the critical section is executed speculatively, or without acquiring a lock. If another thread attempts to execute the critical section in a conflicting manner, speculation fails. Speculation is retried until the critical section is successfully executed. This can also be inefficient if speculation often fails. In addition, significant hardware support may be required to save and restore architectural state upon speculation and failure of speculation. An improved synchronization mechanism is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Speculative Multiaddress Atomicity

Figure 1:
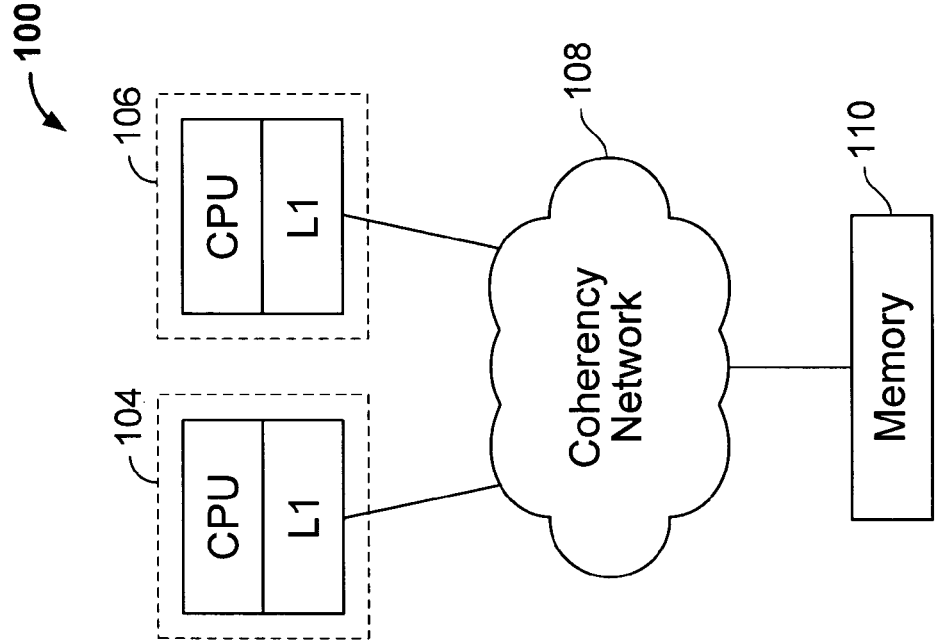
FIG. 1 is a block diagram illustrating a shared memory system.

FIG. 1 is a block diagram illustrating a shared memory system 100. In this example, shared memory system 100 is shown to include cache domain 104, cache domain 106, coherency network 108, and memory 110. Cache domain 104 is shown to include a CPU and an L1 cache. Cache domain 106 is shown to include a CPU and an L1 cache. Cache domains 104 and 106 and memory 110 communicate over coherency network 108. Cache domains 104 and 106 share memory 110. Every element connected to coherency network 108 is coherent.

There are numerous ways in which memory coherency can be maintained. In some embodiments, the shared memory system follows a cache coherency protocol that includes a modify, share, and/or invalid state, such as MSI or MESI. The coherency network may use snoops, directory-based, broadcast, or other protocols. Each cache domain could include multiple cache levels. For example, cache domain 104 could include an L1/L2 cache. Shared memory system 100 could include any number of processors, threads, and memory, and any number of cache domains. Memory 110 could be a global memory and system 100 could include any type of local memory.

In this example, a cache line in the modify state can return the invalid state in response to a coherency request. In addition, each cache has an ability to write back to memory or save data when a store is performed. The motivation for these attributes is more fully described below.

Figure 2:
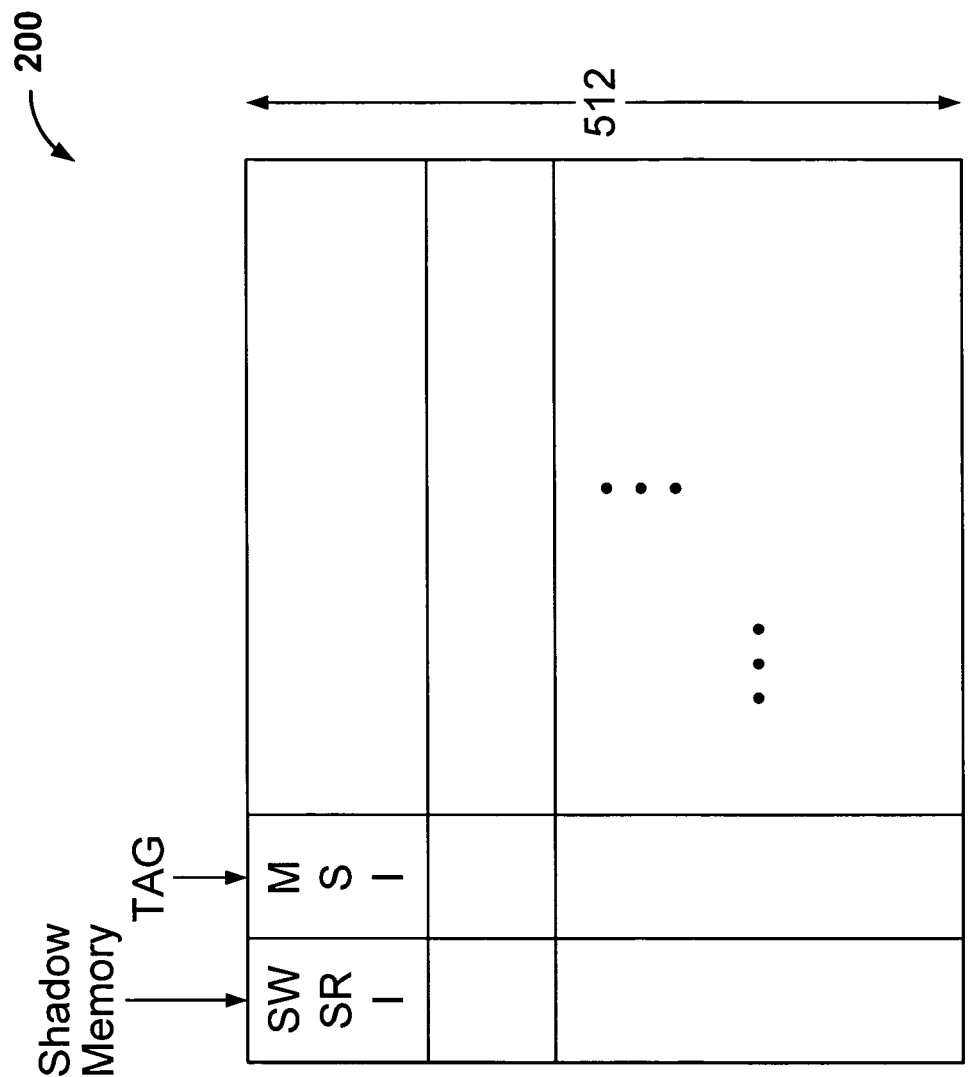
FIG. 2 is a block diagram illustrating a cache.

FIG. 2 is a block diagram illustrating a cache. In this example, cache 200 is shown to include 512 lines each having one of six states: invalid, share speculative read, share commit, modify speculative write, modify speculative read, and modify commit. In this example, each line is marked as being in a state using the shadow memory and tag value. The tag value indicates whether the line is in a modify, share, or invalid state. The tag value indicates an observable (or non-speculative) state. In some embodiments, in response to a coherency request, the tag value of that line is returned. The shadow value indicates whether the line is in a speculative write, speculative read, or invalid state. The shadow value indicates a speculative (or nonobservable) state. In some embodiments, a set of shadow values is stored in a register file so that multiple values can be read or modified in one cycle.

In some embodiments, there are two speculative bits in the shadow memory. In some embodiments, a three bit value is used to store the state. In this example, each line is shown to have a state. This example could also apply to an address where each address has a state. Although a line(s) may be described, any of the examples described herein could also apply to an address(es).

In some embodiments, a speculative state is applied to a plurality of caches.

Figure 3:
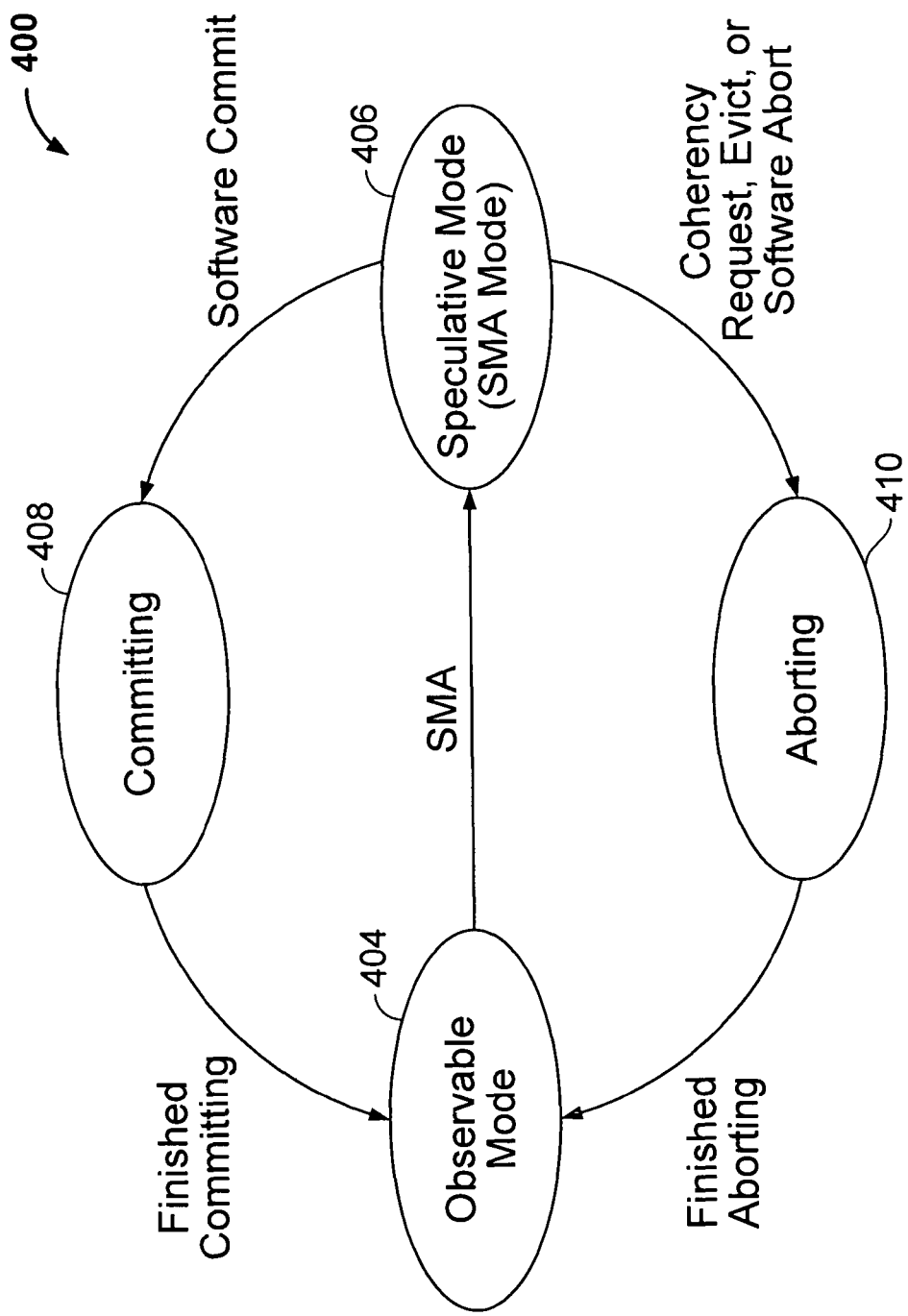
FIG. 3 is a state diagram illustrating various states of a cache.

FIG. 3 is a state diagram illustrating various states of a cache. For example, this state diagram could apply to the cache illustrated in FIG. 2. In this example, state diagram 400 is shown to include observable mode 404, speculative (or SMA) mode 406, committing state 408, and aborting state 410. In some embodiments, a set of software instructions are provided, which include "speculate", "commit", and "abort".

A cache in observable mode 404 transitions to speculative mode 406 when a "speculate" command is received. When in speculative mode 406, speculative operations may be performed on one or more lines or addresses in the cache. For example, an operation could include load (read) or store (write). Speculative operations are operations performed speculatively on the cache, but are not necessarily later committed. For example, during speculative mode, the cache may be disturbed, in which case the line may be invalidated, and the original value of the line retrieved from memory. In some embodiments, the operations performed on the cache when it is in speculative mode 406 form an atomic transaction. An atomic transaction satisfies all ordering and visibility constraints of the shared memory system. The cache transitions to committing state 408 when a "commit" command is received. When in committing state 408, speculative stores made to the cache are committed. When the committing process is complete, the cache returns to observable mode 404.

When the cache is in speculative mode 406, the cache enters aborting mode 410 when a speculative line in the cache is disturbed or an "abort" command is received. In some embodiments, a line is disturbed when a coherency request or eviction is received. For example, if another processor loads data to an address to which data was speculatively loaded or stored, a coherency request is made, and that address is disturbed. If another processor stores or loads data to an address to which data was speculatively stored, that address is disturbed. Also, if another processor stores data to an address to which data was speculatively loaded, that address is disturbed. An eviction could occur when a cache runs out of space. When in aborting state 410, speculative stores made to the cache are aborted. For example, lines or addresses to which data was speculatively stored may be invalidated. In some embodiments, the original data in those lines or addresses can be retrieved from memory. The original data is the last committed data in the line, prior to the speculative stores.

Figure 4A:
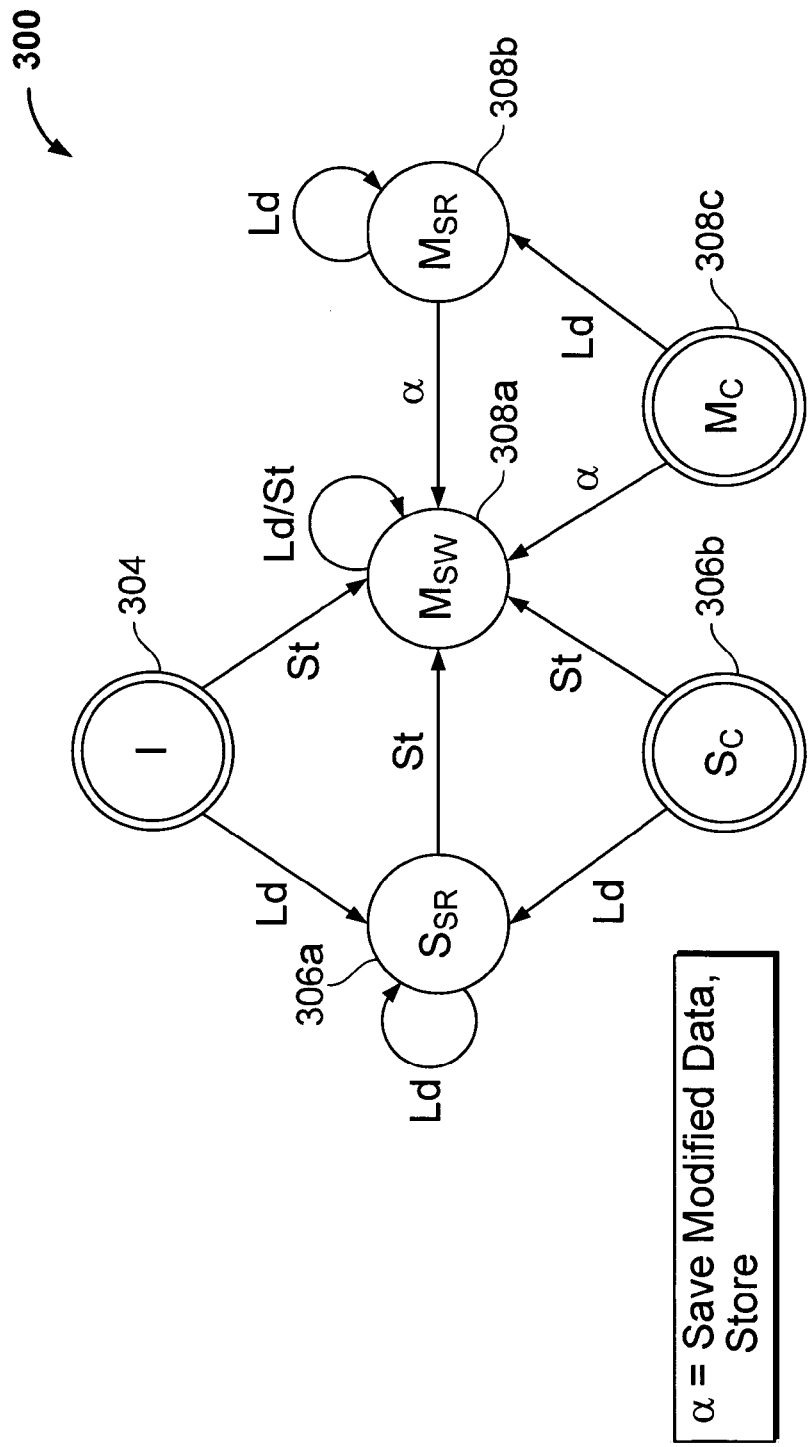
FIG. 4A is a state diagram illustrating various states of a line in a cache and the state transitions resulting from a load or a store under speculation.

FIG. 4A is a state diagram illustrating various states of a line in a cache and the state transitions resulting from a load or a store under speculation. For example, the state diagram may apply to a line (or address) in cache 200. In this example, state diagram 300 is shown to include three observable states and three speculative states. When the cache is in observable mode, each line is in an observable state. When the cache is in speculative mode, each line can be in a speculative state. The three observable states are indicated by a double circle, and include invalid state 304, share state 306b, and modify state 308c. The subscript "C" on states 306b and 308c indicates that the line has been committed, and thus is not in a speculative state.

In some embodiments, the software is aware of observable states, but not of nonobservable states (i.e., speculative states). In some embodiments, the speculative states are the states that occur during an atomic transaction, where the transaction includes a set of one or more operations that are speculatively performed.

The three speculative states include share state 306a, modify state 308a, and modify state 308b. The subscript "SR" on share state 306a indicates that the line is in a speculative read state. The subscript "SW" on state 308a indicates that the line is in a speculative write state. The subscript "SR" on state 308b indicates that the line is in a speculative read state. For example, referring to FIG. 2, a line in modify speculative write state 308a would have a tag value indicating that it is in a modify state and a shadow value indicating that it is in a speculative write state.

In this example, a standard MSI coherency state diagram is modified to include SMA speculative state transitions. Any cache coherency mechanism can be similarly modified in other embodiments. In this example, the state diagram transitions are described as follows:

A line in invalid state 304 transitions to share speculative read state 306a when a load is received for that line. When a store is received, the line transitions to modify speculative write state 308a.

A line in share speculative read state 306a remains in the same state when a load is received. When a store is received, the line transitions to modify speculative write state 308a.

A line in modify speculative write state 308a remains in the same state when a load or a store is received.

A line in share commit state 306b transitions to share speculative read state 306a when a load is received. When a store is received, the line transitions to modify speculative write state 308a.

A line in modify commit state 308c transitions to modify speculative read state 308b when a load is received. When a store is received, the line transitions to modify speculative write state 308a and the (original) modified data is saved, as more fully described below. In some embodiments, the modified data is written back to memory.

A line in modify speculative read state 308b remains in the same state when a load is received. When a store is received, the line transitions to modify speculative write state 308a and the (original) modified data is saved, as more fully described below. In some embodiments, the modified data is written back to memory.

The (original) modified data is saved when there may be a need to retain the modified data. For example, when a store is performed on a line in modify commit state 308c, the line transitions to modify speculative write state 308a. The modified data stored in the line is saved before the store is performed. In the event that an abort occurs, the line transitions to invalid state 304 and the modified data can be retrieved from memory. In some embodiments, the modified data is saved to a lower level of the cache hierarchy rather than memory. In some embodiments, the modified data is stored in a local shadow location.

In some embodiments, transitioning the state of the line includes marking the address (or line) in the cache as being in the new state.

Figure 4B:
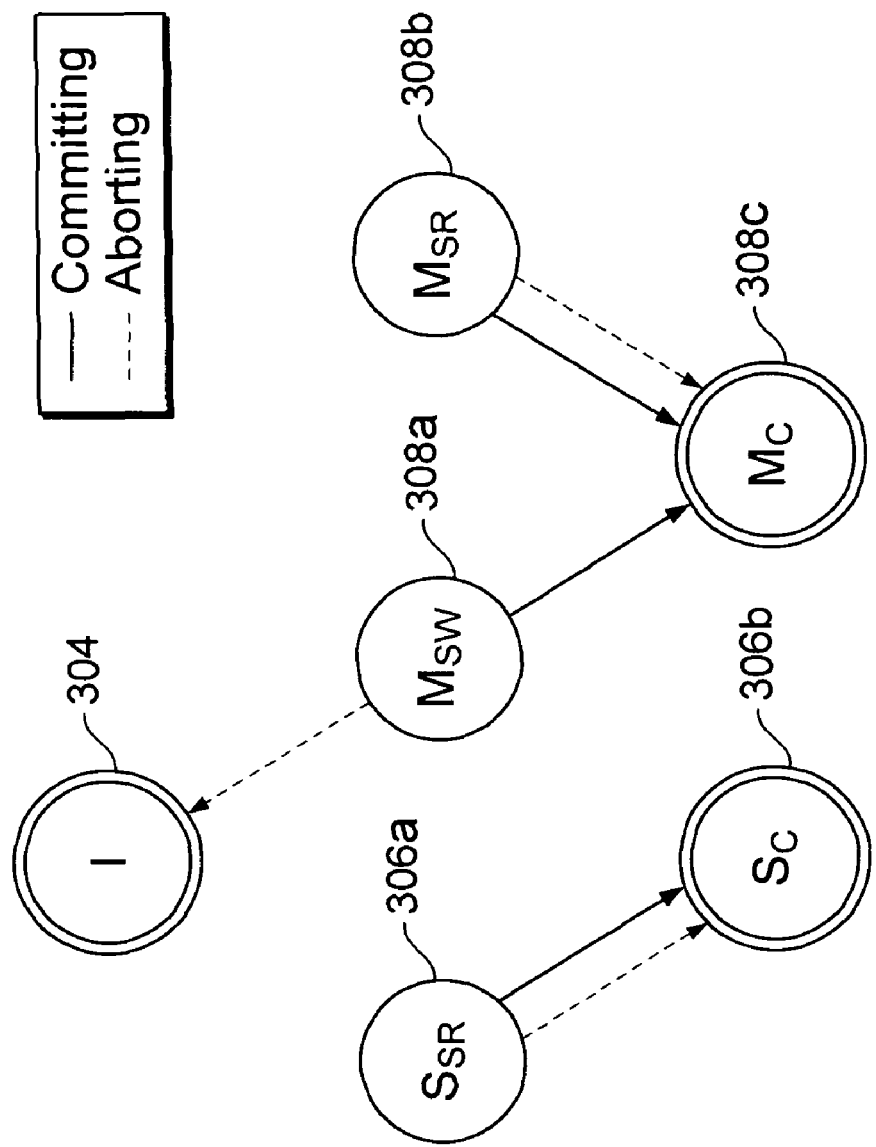
FIG. 4B is a state diagram illustrating various states of a line in a cache and the state transitions resulting from committing or aborting.

FIG. 4B is a state diagram illustrating various states of a line in a cache and the state transitions resulting from committing or aborting. For example, the state diagram may apply to a line (or address) in cache 200. In this example, the cache is in speculative mode and the line is in one of three speculative states: share speculative read state 306a, modify speculative write state 308a, or modify speculative read state 308b. When committing or aborting, the line transitions to one of three observable states: invalid state 304, share commit state 306b, or modify commit state 308c.

When committing, share speculative read state 306a transitions to share commit state 306b. Modify speculative write state 308a and modify speculative read state 308b transition to modify commit state 308c. When aborting, share speculative read state 306a transitions to share commit state 306b. Modify speculative write state 308a transitions to invalid state 304. Modify speculative read state 308b transitions to modify commit state 308c.

If the cache is in observable mode 404, each line is in one of observable states 304, 306b, and 308c and the state of each line can be observed. If the cache is in speculative mode 406, if a speculative line is disturbed, an abort occurs, and the cache returns to observable mode 404. If a non-speculative line is disturbed while in speculative mode, an abort will not necessarily occur. In some embodiments, a cache line can only be in a speculative state while in speculative mode. Each line in a speculative state returns to one of states 304, 306b, and 308c, depending on which speculative state 306a, 308a, and 308b, the line was in prior to the abort.

Figure 5A:
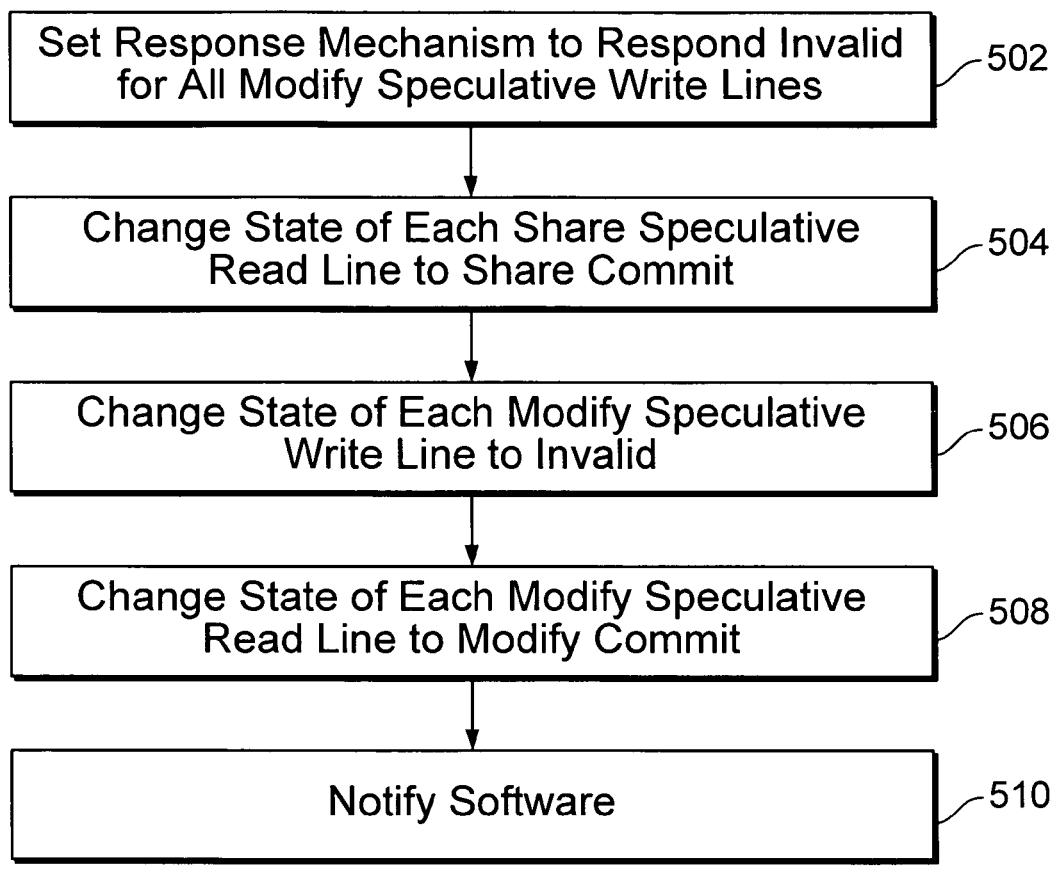
FIG. 5A is a flowchart illustrating an abort process.

FIG. 5A is a flowchart illustrating an abort process. In some embodiments, this process is performed on cache 200 when it is in aborting state 410. In this example, the state of each line in the cache is stored as shown in FIG. 2. When a coherency request is made of a line, the tag value of that line is returned.

In some embodiments, a response mechanism is set to respond "invalid" for all modify speculative write lines (502). As shown in FIG. 4B, a line that is in modify speculative write state 308a transitions to invalid state 304 when an abort occurs (during aborting state 410). In some embodiments, the abort process is atomic. The processor waits until the lines are transitioned (e.g., the tag values are changed) to invalid before responding to coherency requests. In some embodiments, rather than wait, a response mechanism is set to respond "invalid" for those lines (502).

The state of each share speculative read line is changed to share commit (504). The state of each modify speculative write line is changed to invalid (506). The state of each modify speculative read line is changed to modify commit (508). In (504) and (508), the tag value of the line does not change, so setting a response mechanism is not useful. The state transitions for (504)-(508) are shown in FIG. 4B. The software is notified (510) of the abort. For example, a trap, flag, interrupt, or exception could be generated. In some embodiments, the cache is now in observable mode 404.

In this example, when a coherency request is made of a line, the tag value of that line is returned. In other embodiments, the state of each line may be stored in other ways and other response mechanism(s) may be set.

There are various alternative ways to designate a set of observable and speculative states. For example, rather than designating state 308a as modify speculative write, state 308a could be designated as invalid speculative write. In this case, (502) could include setting the response mechanism to respond "modify" for all invalid speculative write lines.

Figure 5B:
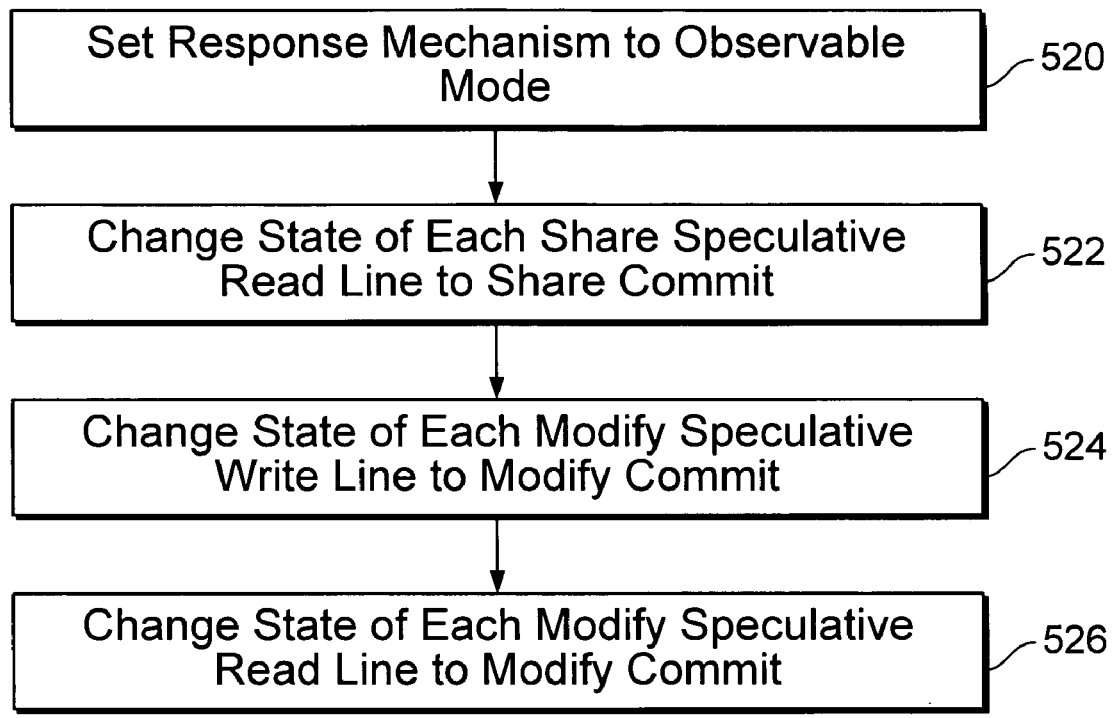
FIG. 5B is a flowchart illustrating a commit process.

FIG. 5B is a flowchart illustrating a commit process. In some embodiments, this process is performed on cache 200 when it is in committing state 408. In this example, the state of each line in the cache is stored as shown in FIG. 2. When a coherency request is made of a line, the tag value of that line is returned.

In this example, a response mechanism is set to observable mode (520). (520) is a non-operation, to contrast (502) in FIG. 5A, in which a response mechanism is set. The state of each share speculative read line is changed to share commit (522). The state of each modify speculative write line is changed to modify commit (524). The state of each modify speculative read line is changed to modify commit (526). The state transitions for (522)-(526) are shown in FIG. 4B. In some embodiments, the cache is now in observable mode 404.

In this example, when a coherency request is made of a line, the tag value of that line is returned. In other embodiments, the state of each line may be stored in other ways and one or more response mechanisms may be set. In some embodiments, the commit process is atomic.

Dynamic Concurrent Atomic Execution

Figure 6:
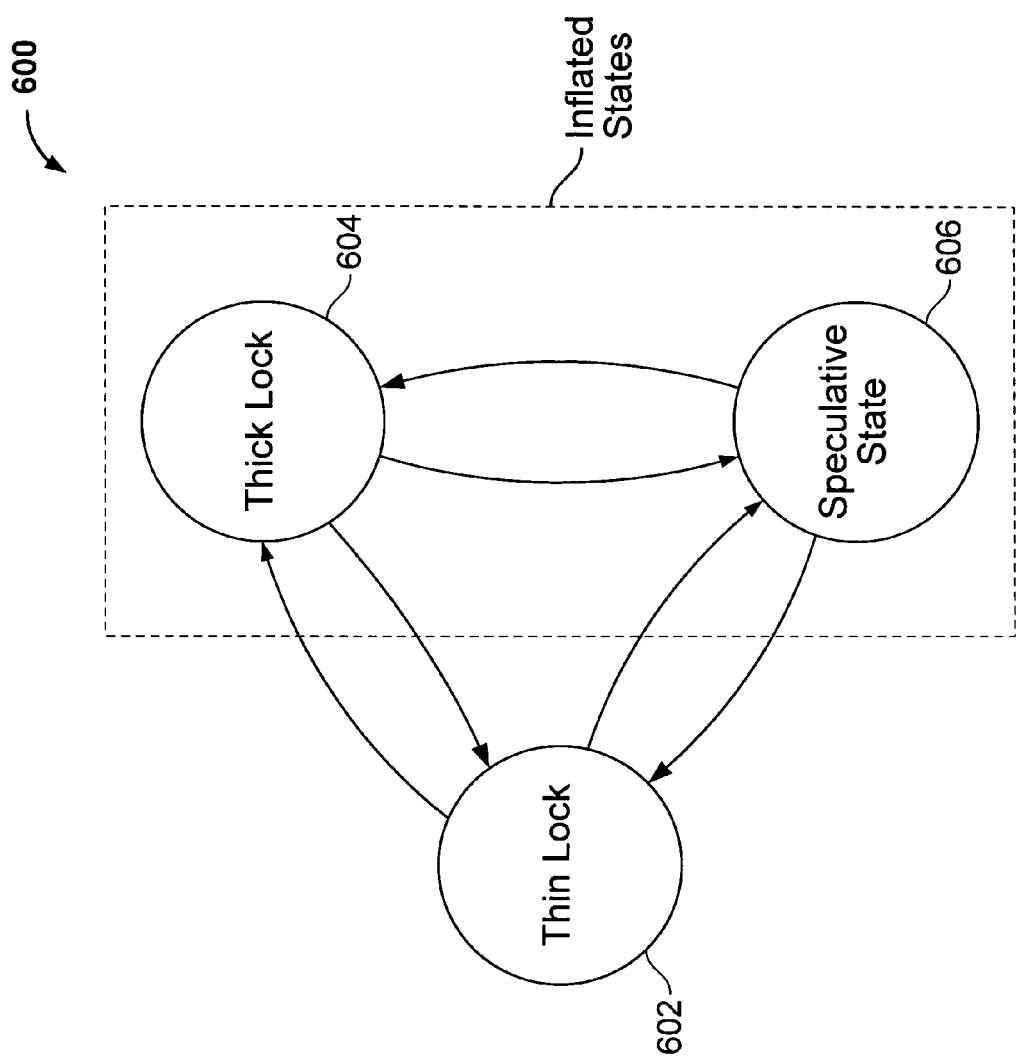
FIG. 6 is a state diagram illustrating an embodiment of various synchronization states in a shared memory system.

FIG. 6 is a state diagram illustrating an embodiment of various synchronization states in a shared memory system. In the example shown, state diagram 600 is shown to include thin lock state 602, thick lock state 604, and speculative state 606. Thick lock state 604 and speculative state 606 are inflated states, as shown. Thick lock state 604 can also be referred to as a blocking lock state. Speculative state 606 can also be referred to as a speculative lock state, even though a lock is not actually acquired, as more fully described below. Speculative state 606 refers to a synchronization state of an object, and is different from the speculative state of a line that is described above.

A set of instructions may need to be executed atomically. For example, the set of instructions could include a block of code or a critical section of code. Atomic execution of a set of instructions refers to execution such that the only observable states are those produced either by executing all or by executing none of the instructions in the set. Intermediate states that represent partial execution of the set of instructions are not observable outside of the atomic execution itself. When a set of instructions is to be executed atomically, the execution may acquire a thin lock, or it may acquire a thick lock, or it may execute speculatively without acquiring the lock. A thin lock refers to a lock state that can be stored in an object that is being locked, such as in a header of the object. In this example, thick locks and speculative execution require an inflated state. An inflated state refers to a state that may require storing and accessing an additional structure, such as a lock object. In some embodiments, the additional structure would not normally fit within the object that is being locked. When there is no lock contention, a thin lock may be obtained, and the thin lock state can be maintained. When there is lock contention, an inflated state that can accommodate queuing, as more fully described below, is created. The inflated state can include a thick lock state (e.g., acquiring a thick lock) or a speculative state.

Transitions can occur between any of the states. The transitions between states can depend on lock contention, success of speculation, time elapsing, the number of atomic executions performed, systemic events such as garbage collection, and other factors. For example, a thin lock can be inflated (i.e., converted) to a thick lock or a speculative lock. For example, inflation may occur when there is lock contention. A thick lock can be deflated (i.e., converted) to a thin lock. A speculative lock can be deflated to a thin lock. For example, deflation may occur during garbage collection. A thick lock can be converted to a speculative lock and vice versa. For example, after failing speculation after a certain number of tries, a speculative lock may be converted to a thick lock. For example, after a certain number of contention events, a thick lock may be converted to a speculative lock. Further examples are described more fully below. Any appropriate mechanism and underlying form of speculative hardware, such as transactional memory, speculative lock elision, speculative multi-address atomicity, etc. may be used.

Figure 7A:
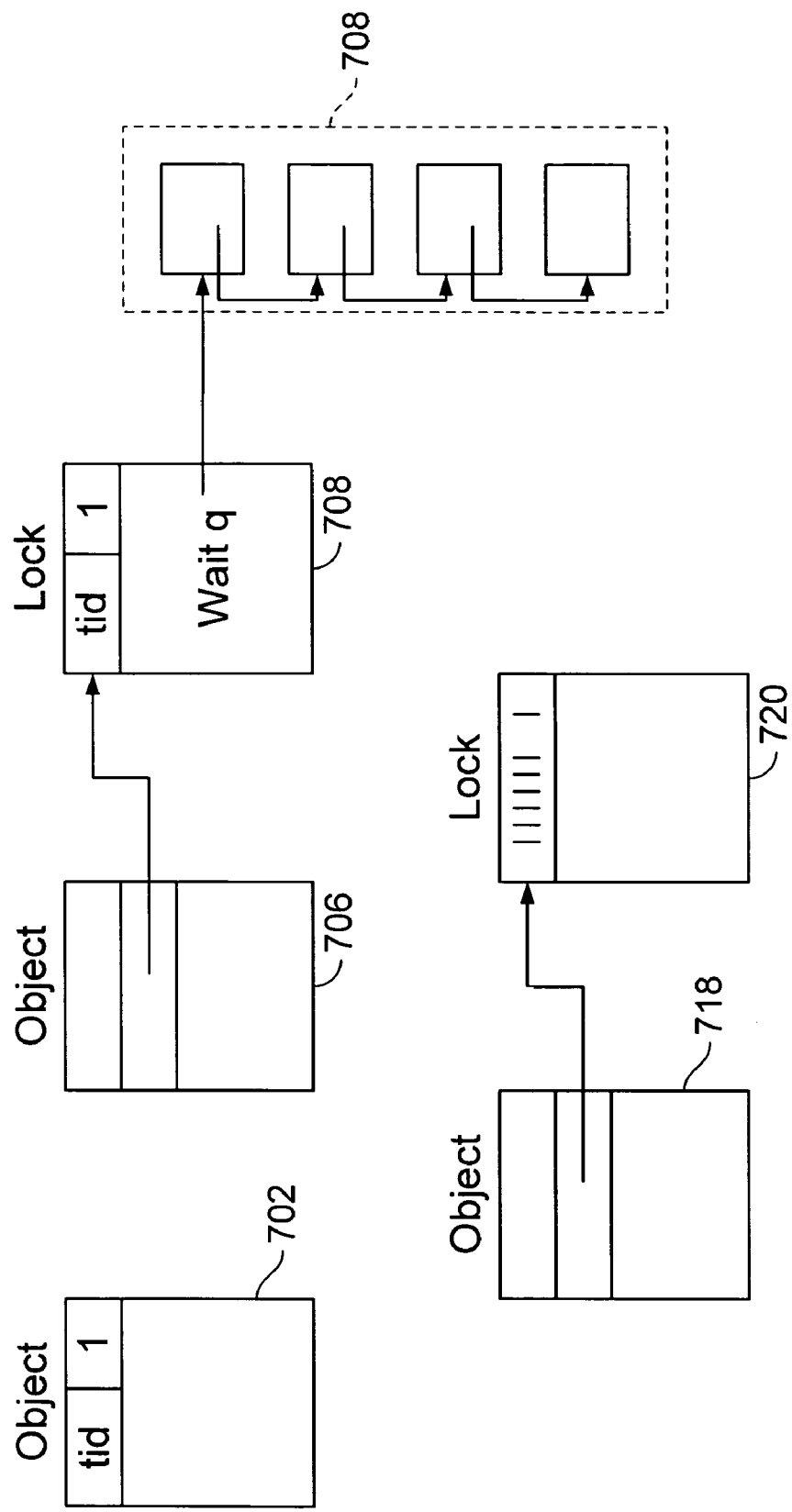
FIG. 7A is a block diagram illustrating various embodiments of synchronization states.

FIG. 7A is a block diagram illustrating various embodiments of synchronization states. In the example shown, object 702 is thin locked, object 706 is thick locked, and object 718 is speculatively locked. Although objects may be described in this example, any other appropriate structure may also be used in various embodiments. An object may be associated with an atomic block of code (i.e., a block of code that needs to be executed atomically), which may include a critical section, for example.

In this example, the thin lock on object 702 is indicated by a thread ID (tid) and a lock word in a header of object 702. A lock word value of 1 indicates that there is a thin lock on object 702 held by a thread with that thread ID. If object 702 is thin locked and another thread attempts to acquire a thin lock on object 702, the thin lock is inflated, or converted to a thick lock. The header could include an indication of whether the lock is inflated.

The thick lock on object 706 is indicated by a tid and a lock word in lock object 708. Lock object 708 includes a word that stores the tid and lock word. A lock word of 1 (and tid not all 1's) indicates that there is a thick lock on object 706 held by a thread with that thread ID. A lock word of 0 indicates that no lock is held on object 706, and a thick lock is advised. Lock object 708 also includes a wait queue (waitq) 708 as shown. If object 706 is thick locked and another thread attempts to acquire a thick lock on object 706, the other thread is placed in queue 708, as more fully described below.

The speculative lock on object 718 is indicated by a tid and a lock word in lock object 720. Lock object 720 includes a word that includes a place for a thread ID and a lock word. When the thread ID is all 1's and the lock word is 1, this indicates that speculation is advised, and a thread may proceed to speculatively operate on this object.

In some embodiments, a thin lock is faster and less expensive than a speculative lock. In some embodiments a speculative lock is faster and less expensive than a thick lock.

In various embodiments thin, thick, and speculative locks may be indicated in various ways. For example, a speculative state could be indicated in a thin lock, e.g., the speculative state could be indicated in the object header.

Figure 7B:
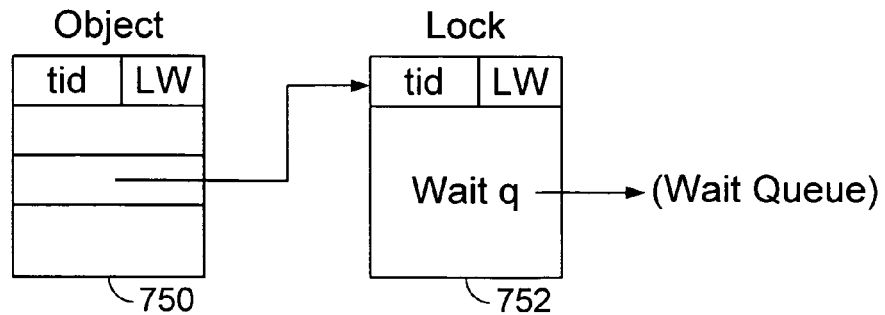
FIG. 7B illustrates an example of one way to designate various states and indicators in an object and lock object.

FIG. 7B illustrates an example of one way to designate various states and indicators in an object and lock object. Object 750 is shown to include a header having a thread ID (tid) and a lock word (LW). Lock object 752 is shown to include a word having a thread ID (tid) and a lock word (LW). Table 754 is shown to include columns corresponding to various values of the object tid and object LW and the lock tid and lock LW. From these values, a synchronization state for the object can be determined. "X" indicates any value (i.e., don't care). The bracketed parameters indicate the values of the parameters within the brackets. For example, if the inflated indicator value is all 1's, then when the object LW is 1 and the object tid is all 1's, the lock is inflated. The lock tid and lock LW can then be read to determine whether the lock is thick locked, should be thick locked, or is in a speculative state. When the object LW is 1 and the object tid is not all 1's, then the object is thin locked. When the object LW is 0, then the object can be thin locked. There are numerous other ways to designate synchronization states. FIG. 7B is merely one example.

Figure 8:
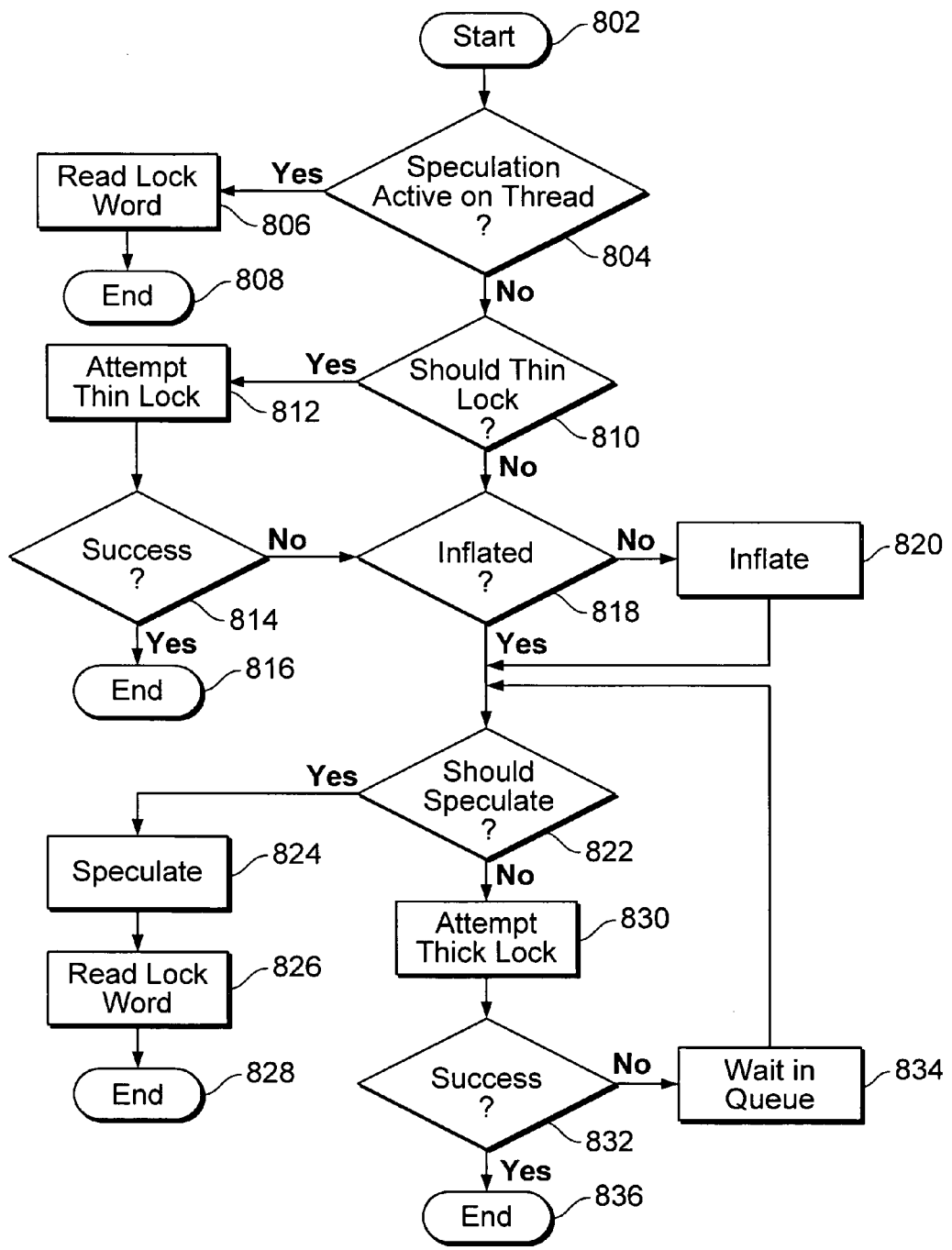
FIG. 8 is a flowchart illustrating an embodiment of a process for entering a synchronization state.

FIG. 8 is a flowchart illustrating an embodiment of a process for entering a synchronization state. For example, a thread attempting to execute an atomic block may follow this process. In the example shown, the process begins at 802. At 804, it is determined whether speculation is active on the thread. For example, the thread could already be speculatively executing another block. If speculation is active, then at 806, a lock word is read and the process ends at 808. The appropriate lock word is read in order to prevent the speculation to continue should a lock on the object be acquired by another thread. In the case of a thin lock, the object lock word is read. In the case of a thick lock, the lock object lock word is read.

At 804, if speculation is not active on the thread, then at 810, it is determined whether the object should be thin locked. In other words, it is determined whether the object is both not thin locked and not inflated. For example, an indication of whether the object should be thin locked may be stored in the header of the object, in which case the header is read. If it is determined that the object should be thin locked, then at 812, a thin lock is attempted. At 814, it is determined whether the thin lock was successfully acquired. For example, another thread could have just acquired the thin lock. If the thin lock was successfully acquired, the process ends at 816. If the thin lock was not successfully acquired, then at 818, it is determined whether there is an inflated lock on the object. Returning to 810, if it is determined that the object should not be thin locked, then the process continues at 818.

At 818, if it is determined that there is an inflated lock on the object, the process continues at 822. Otherwise, the thin lock is inflated at 820 and the process continues at 822. At 822, it is determined whether the thread should speculate. For example, an indication may be stored in the header of the lock object, in which case that header is read. For example, a positive indication to speculate may be that the tid of the header is all 1's. A negative indication may be that the lock word is 0. If it is determined that the thread should speculate, then at 824, the thread starts speculating. There are various ways to start speculation. In some embodiments, speculation is entered using a software method, as more fully described below. At 826, the lock word on the lock object is read to ensure that the speculation is aborted should a lock be subsequently acquired on the lock object (e.g., by another thread). At 828, the process ends.

Returning to 822, if it is determined that the thread should not speculate, then at 830, a thick lock is attempted. At 832, it is determined whether the thick lock was successfully acquired. If the thick lock was successfully acquired, the process ends at 836. If the thick lock was not successfully acquired (i.e., there is another thread holding a thick lock on the object), then the thread is queued at 834. When the other thread has released the thick lock, the process returns to 822, and it is determined whether the thread should speculate.

Figure 9:
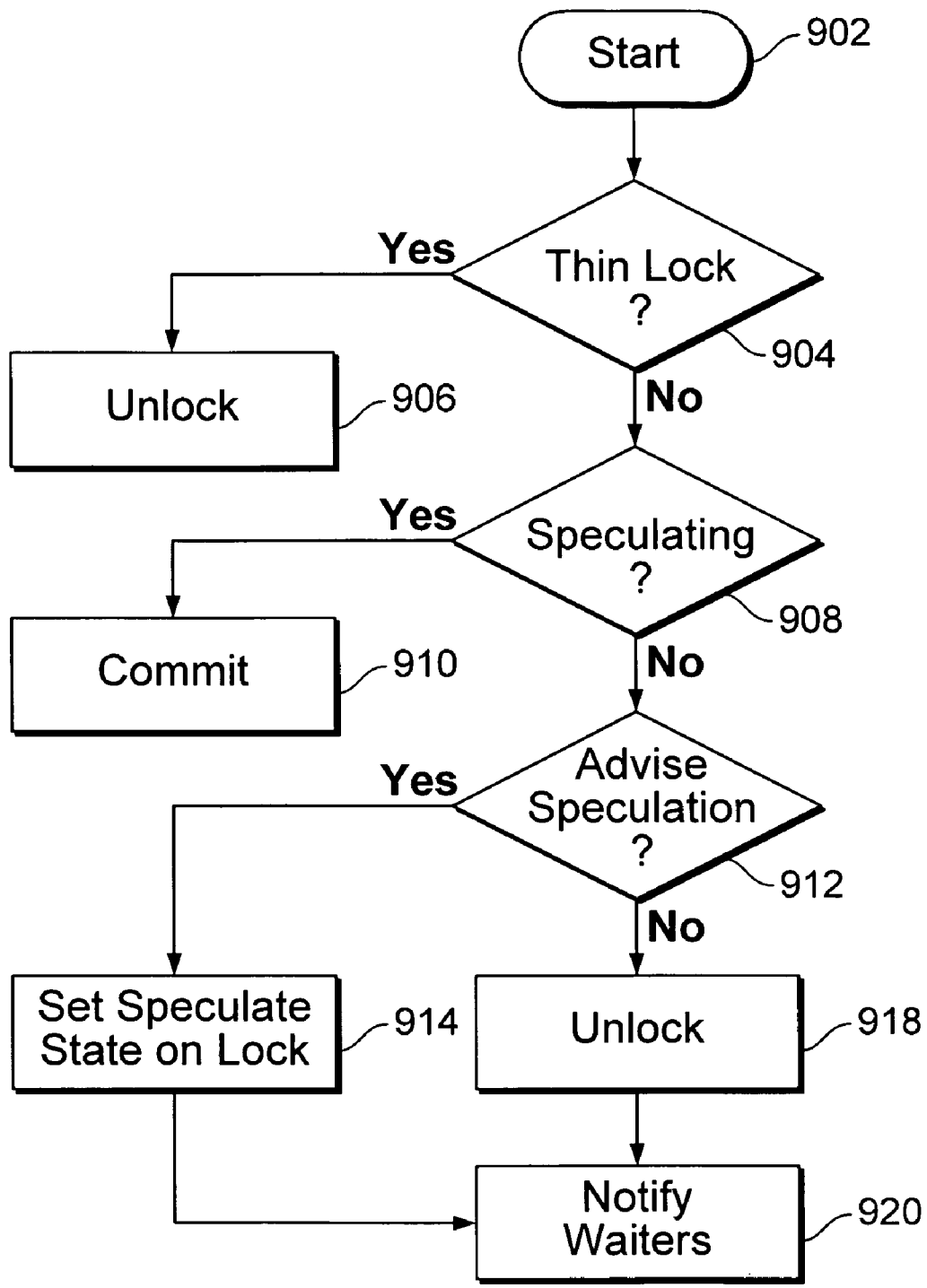
FIG. 9 is a flowchart illustrating an embodiment of a process for exiting a synchronization state.

FIG. 9 is a flowchart illustrating an embodiment of a process for exiting a synchronization state. For example, a thread that has completed execution of an atomic block may use this process. In the example shown, the process begins at 902. At 904, it is determined whether the thread has a thin lock on the object. If it does, the thin lock is released at 906. Inflated locks could be handled, e.g., if the thin lock has been inflated.

If it does not have a thin lock, then at 908, it is determined whether the thread was speculating the execution this lock. For example, the thread could be speculating the execution of some other lock, with this lock being a nested lock. If it was speculating the execution of this lock, then a commit is performed at 910. If it was not speculating, then at 912, it is determined whether speculation would be advised (e.g., for the next thread considering acquiring the lock. In other words, if it was not speculating, then it holds a thick lock. It can be determined whether speculation would be advised based at least in part on dynamic information associated with synchronization data, as more fully described below. For example, if there are no other threads in the queue, then speculation might be advised. Speculation advice could include rules, such as the number of times to retry speculation before acquiring a lock. If speculation would not be advised, then at 918, the lock is released. For example, the header of the lock object is modified so that the lock word is 0. If it is determined that speculation would be advised, then at 914, a speculate state is set on the lock. For example, the tid of the lock object is set to all 1's and the lock word of the lock object is set to 1. This releases the lock, and indicates to the next thread considering acquiring the lock that speculation is advised. At 920, waiter(s), if any, are notified. The waiters refer to the threads that are queued for thick lock acquisition.

The synchronization data may change with time and with execution. Synchronization data includes data based on the experience of the lock (e.g., success or failure rate of the lock under the various states) or heuristic information, such as the number of threads waiting. The synchronization data can change with time due to previous experience with the lock, previous experience with speculation, time elapsed, systemic events, such as garbage collection, etc. For example, synchronization data could include initial data (e.g., initial advice on whether to speculate). Data could be reset at various times, e.g., periodically or in an event driven manner.

The synchronization data could also include a mutex or a semaphore. The synchronization data could include an object associated with a Java Virtual Machine monitor. The Java Virtual Machine monitor is described in *The Java Virtual Machine Specification* (Tim Lindholm and Frank Yellin, Addison-Wesley Professional, 2nd edition, Apr. 14, 1999), which is incorporated herein by reference for all purposes. The Java bytecodes monitor_enter and monitor_exit are used to denote a synchronized block. The synchronization data could include an object associated with a Java synchronized method. In the case of synchronized methods, there are no monitor enter and exit bytecodes. The monitor enter and exit are implicit in the enter and exit methods.

The synchronization data could include an object associated with a Java synchronized block, an object associated with a .NET synchronized method, or an object associated with a .NET SyncBlock.

In this example, speculation advice is determined on lock release. In various embodiments, speculation advice can be determined at various times. For example, speculation advice could be determined on lock entry.

Figure 10:
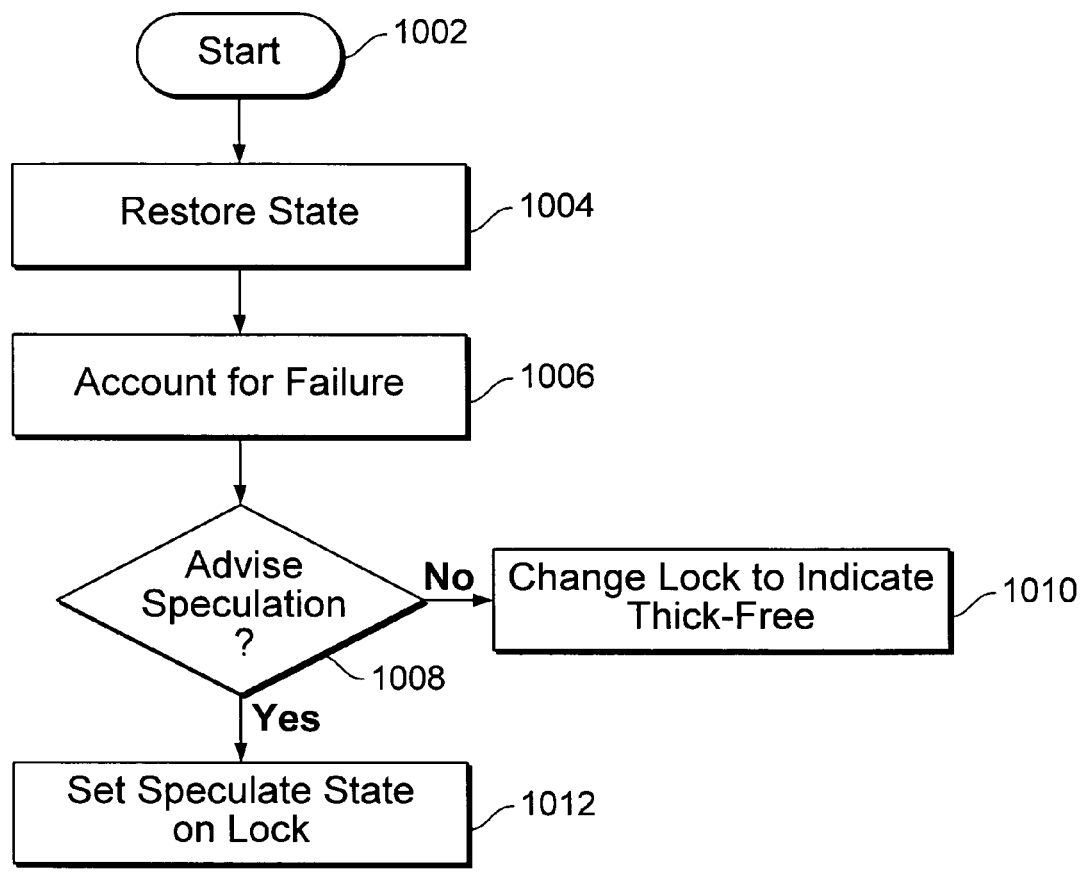
FIG. 10 is a flowchart illustrating an embodiment of a process for aborting from speculation.

FIG. 10 is a flowchart illustrating an embodiment of a process for aborting from speculation. For example, a thread that receives an indication that speculative execution of an atomic block has failed may follow this process. In the example shown, the process begins at 1002. At 1004, state is restored. Register states may be restored by software and/or hardware mechanisms. In some embodiments, register states are restored according to the process of FIG. 12. At 1006, failure is accounted for. For example, the failure is accounted for in the synchronization data, which can be used at 1008. Synchronization data could include, for example, how often the thread was aborted during speculation of this block or other blocks, by this thread or other thread(s). At 1008, it is determined whether speculation would be advised (e.g., for the next thread considering acquiring the lock.)

If it is determined that speculation would not be advised, then at 1010, the lock is changed to indicate thick and free. For example, the header of the lock object is set to 0. This indicates to the next thread considering acquiring the lock that a thick lock is advised and that the lock is free.

If it is determined that speculation would be advised, then at 1012, a speculate state is set on the lock. For example, the tid of the lock object is set to all 1's and the header of the lock object is set to 1. This indicates to the next thread considering acquiring the lock that speculation is advised. In some embodiments, the process continues at 822 in FIG. 8, and it is determined whether speculation should be retried.

Concurrent Atomic Execution

Figure 11:
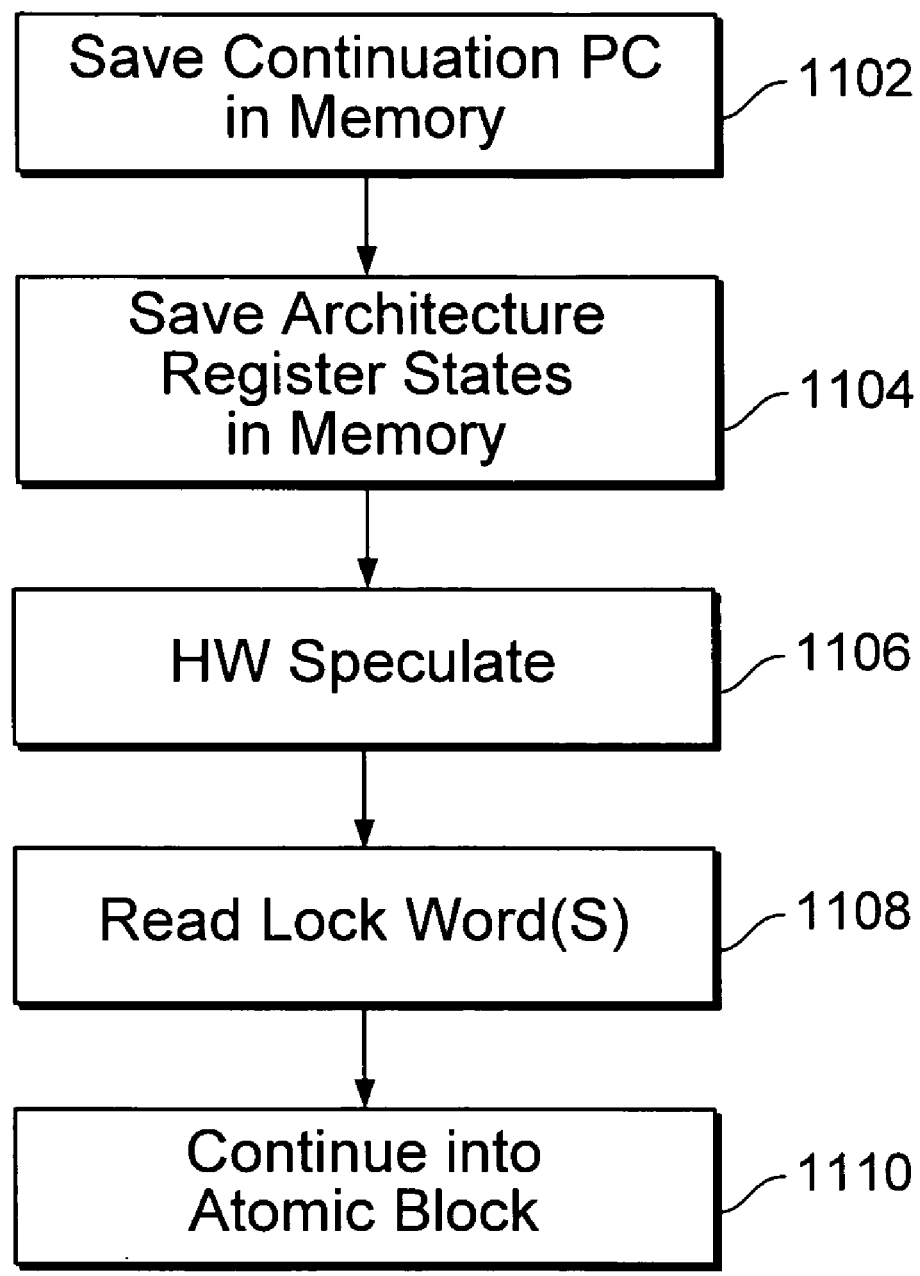
FIG. 11 is a flowchart illustrating an embodiment of a process for entering a speculative mode.

FIG. 11 is a flowchart illustrating an embodiment of a process for entering a speculative mode. For example, a thread attempting to execute an atomic block may use this process. In the example shown, at 1102, a continuation program address (e.g., program counter) is saved in memory. A stack position could be saved. The continuation program counter may be have custom code specific to a site. At 1104, architecture register states are stored in memory. For example, the architecture register states may be stored in a software data structure. At 1106, the hardware enters a speculative mode. For example, a "speculate" command is sent. In some embodiments, the hardware enters a speculative mode according to a process described above. At 1108, a lock word (or words) is read. Reading a lock word ensures that if another thread acquires the lock and modifies the lock word, the speculation will be aborted. At 1110, the process continues into the atomic block.

Figure 12:
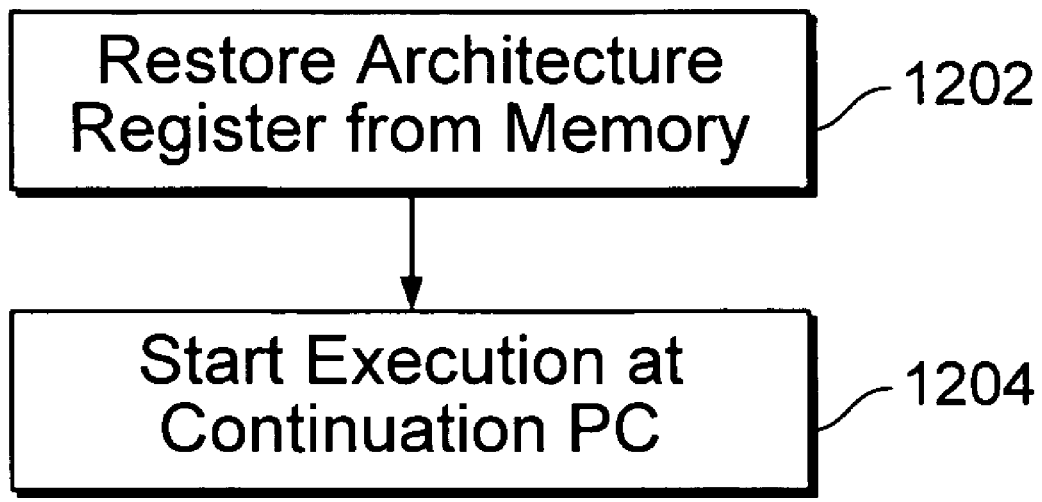
FIG. 12 is a flowchart illustrating an embodiment of a process for aborting from a speculative mode.

FIG. 12 is a flowchart illustrating an embodiment of a process for aborting from a speculative mode. For example, a thread that receives an indication that speculative execution of an atomic block has failed may perform this process. The hardware may detect an abort condition. An "abort" command may be sent. In some embodiments, executing a system call or an I/O operation causes an abort condition.

In the example shown, at 1202, architecture register(s) are restored from memory. In some embodiments, the number of and/or an indication of which registers were used during speculation is saved at 1104, so that only those registers need to be restored at 1202. For example, the information can be relayed with a "registers saved" mask word. At 1204, execution is started from the continuation program counter. In some embodiments, the continuation program counter includes instructions for restoring the architecture registers. The continuation program counter could include generic code for restoring all registers. The continuation program counter may be common to multiple sites.

Figure 13:
FIG. 13 is a flowchart illustrating an embodiment of a process for committing from a speculative mode.

FIG. 13 is a flowchart illustrating an embodiment of a process for committing from a speculative mode. For example, a thread may have finished speculatively executing an atomic block. A "commit" command may be sent. In the example shown, a hardware commit is performed at 1302. In some embodiments, the hardware performs a commit according to a process described above.

Transparent Concurrent Atomic Execution

Figure 14:
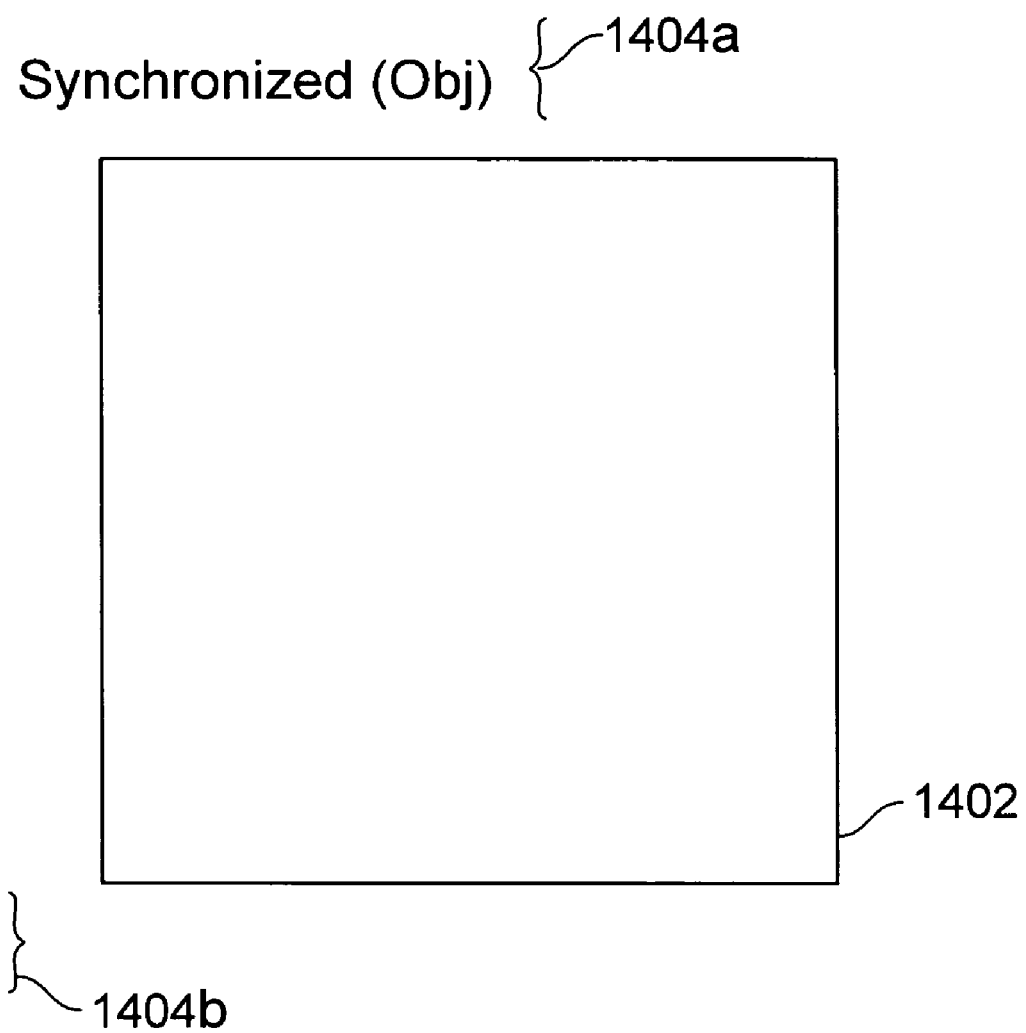
FIG. 14 is a diagram illustrating a block of code having a synchronization indication.

FIG. 14 is a diagram illustrating a block of code having a synchronization indication. In this example, the block of code refers to application code. As used herein, application code refers to code that is compiled for running on a virtual machine. Machine code refers to the virtual machine execution code. In other words, the machine code executes the application code.

In the example shown, a block of code has an indication that the block of code is to be executed using a synchronization mechanism. In this example, a Java synchronized block is shown. In various embodiments, an indication could be provided in various programming languages for any block of code running on any virtual machine. For example, a synchronization indication can be provided for a .NET synchronized method or .NET SyncBlock executing on a .NET CLR.

In the example shown, the synchronization indication is the keyword "synchronized" in Java. A block of code 1402 is enclosed by curly brackets (or braces) 1404a and 1404b. Block 1402 can include a method. The keyword "synchronized" indicates that block 1402 is to be executed atomically. For example, block 1402 may include critical code.

In some embodiments, block 1402 is executed speculatively. For example at bracket 1404a, speculation begins, and at bracket 1404b, a commit is performed. Any appropriate speculation mechanism may be used. In some embodiments, a determination is made as to whether block 1402 should be executed speculatively, as described above.

If speculation fails, the VM can roll the application visible VM state back to the state that existed at the beginning of the synchronized block. The VM can attempt to re-execute the code speculatively or by acquiring a lock on the object (obj), depending on heuristics.

The VM transparently provides speculative execution of the block. The block of code does not necessarily provide an indication that the block of code should be speculatively executed. The application or program does not need to be aware of the speculation or the underlying mechanism used to execute the block. The VM determines whether to speculatively execute the block. In some embodiments, the decision can be different on a per synchronized object basis. For example, for two objects, the VM can decide to speculatively execute the block on one object, but not on the other object.

In some embodiments, it is determined whether the block of code should be speculatively executed. The determination may be based on dynamic information associated with synchronization data, as described above. If it is determined that the block of code is to be executed without speculation, a lock may be acquired, such as a thin or a thick lock.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for attempting to execute a set of one or more instructions speculatively, comprising:
    executing a speculative execution command to directly cause the set of one or more instructions to be executed speculatively, wherein the speculative execution command does not read any value from any memory location and does not write any value to any memory location;
    reading data from at least one memory location after executing the speculative execution command and before executing the set of instructions, wherein the read data can be used to determine whether a synchronization mechanism has been exclusively acquired;
    speculatively executing the set of one or more instructions, the set of one or more instructions including at least one store to a memory location;
    receiving a commit command that is an instruction indicating that the speculative execution is successful and at least one store is ready to be committed or an abort command that is an instruction indicating that an abort condition of the speculative execution command is detected;
    in the event that the commit command is received, committing the store to the memory location; and
    in the event that the abort command is received, reverting the store to the memory location.

2. A method as recited in claim 1, further comprising using the read data to determine whether the synchronization mechanism has been exclusively acquired.

3. A method as recited in claim 2, further comprising aborting the speculative execution before it is committed if it is determined that the synchronization mechanism has been exclusively acquired.

4. A method as recited in claim 1, wherein the synchronization mechanism includes at least one of the following: a lock, a mutex, a semaphore, an object associated with a Java Virtual Machine monitor, an object associated with a Java synchronized method, an object associated with a Java synchronized block, an object associated with a .NET synchronized method, and an object associated with a .NET SyncBlock.

5. A system for attempting to execute a set of one or more instructions speculatively, comprising:
    a processor configured to:
        execute a speculative execution command in hardware, wherein the speculative execution command directly causes the set of one or more instructions to be executed speculatively, the speculative execution command does not read any value from any memory location and does not write any value to any memory location;
        read data from at least one memory location after executing the speculative execution command and before executing the set of instructions, wherein the read data can be used to determine whether a synchronization mechanism has been exclusively acquired;
        speculatively execute the set of one or more instructions, the set of one or more instructions including at least one store to a memory location;
        receive a commit command that is an instruction indicating that the speculative execution is successful and at least one store is ready to be committed or an abort command that is an instruction indicating that an abort condition of the speculative execution command is detected;
        in the event that the commit command is received, commit the store to the memory location; and
        in the event that the abort command is received, revert the store to the memory location; and
    a memory coupled with the processor, wherein the memory is configured to provide the processor with instructions.

6. A system as recited in claim 5, wherein the process is further configured to use the read data to determine whether the synchronization mechanism has been exclusively acquired.

7. A system as recited in claim 6, further comprising aborting the speculative execution before it is committed if it is determined that the synchronization mechanism has been exclusively acquired.

8. A computer program product for attempting to execute a set of one or more instructions speculatively, the computer program product being embodied in a computer readable storage medium and comprising computer instructions for:
    executing a speculative execution command to directly cause the set of one or more instructions to be executed speculatively, wherein the speculative execution command does not read any value from any memory location and does not write any value to any memory location;

reading data from at least one memory location after executing the speculative execution command and before executing the set of instructions, wherein the read data can be used to determine whether a synchronization mechanism has been exclusively acquired;

speculatively executing the set of one or more instructions, the set of one or more instructions including at least one store to a memory location;

receiving a commit command that is an instruction indicating that the speculative execution is successful and the at least one store is ready to be committed or an abort command that is an instruction indicating that an abort condition of the speculative execution command is detected;

in the event that the commit command is received, committing the store to the memory location; and in the event that the abort command is received, reverting the store to the memory location.

9. A computer program product as recited in claim 8, further comprising using the read data to determine whether the synchronization mechanism has been exclusively acquired.

10. A method as recited in claim 9, further comprising aborting the speculative execution before it is committed if it is determined that the synchronization mechanism has been exclusively acquired.

* * * * *